United States Patent [19]

Matsumoto

[11] Patent Number: 4,660,965
[45] Date of Patent: Apr. 28, 1987

[54] PICTURE FRAME DETECTING AND STOPPING METHOD

[75] Inventor: Fumio Matsumoto, Tokyo, Japan

[73] Assignee: Fuji Photo Film Co., Ltd., Kanagawa, Japan

[21] Appl. No.: 879,828

[22] Filed: Jun. 26, 1986

Related U.S. Application Data

[63] Continuation of Ser. No. 709,121, Mar. 6, 1985, abandoned.

[30] Foreign Application Priority Data

Mar. 21, 1984 [JP] Japan .................. 59-54018

[51] Int. Cl.[4] .......................................... G03B 27/52
[52] U.S. Cl. ...................................... 355/41; 355/68; 250/561
[58] Field of Search ............................ 355/41, 68, 77; 250/559-561; 356/444; 358/214-216

[56] References Cited

U.S. PATENT DOCUMENTS

| 3,469,105 | 9/1969 | Stasey ........................ 250/561 |
| 3,519,347 | 7/1970 | Bowker et al. .............. 355/38 |
| 3,699,349 | 10/1972 | Paulus et al. ............. 355/68 X |
| 4,338,634 | 7/1982 | Dillion et al. ............ 356/214 |

FOREIGN PATENT DOCUMENTS

| 52-23936 | 2/1977 | Japan ..................... 355/68 |
| 54-28131 | 2/1979 | Japan ..................... 355/68 |
| 56-2691 | 12/1981 | Japan ..................... 355/68 |

*Primary Examiner*—L. T. Hix
*Assistant Examiner*—D. Rutledge
*Attorney, Agent, or Firm*—Wenderoth, Lind & Ponack

[57] ABSTRACT

In a photographic printer in which an original film is conveyed and mounted on a film carrier and a light from a light source and passing the film carrier is received to a two-dimensional image sensor, picture information regarding divided picture elements are detected through the whole area of the original film and a distance to be moved of the original film is obtained in accordance with the size information of the orginal film. The respective picture frames of the original film are detected by receiving a transmitted or reflected light from the original film on the film carrier using the two-dimensional image sensor and the original film is then conveyed by the distance obtained in the previous step so as to thereby position and stop the picture frames on the film carrier. In addition, the picture frames can be automatically conveyed and the exposure amount calculated and corrected in accordance with the picture information regarding the divided picture elements.

5 Claims, 12 Drawing Figures

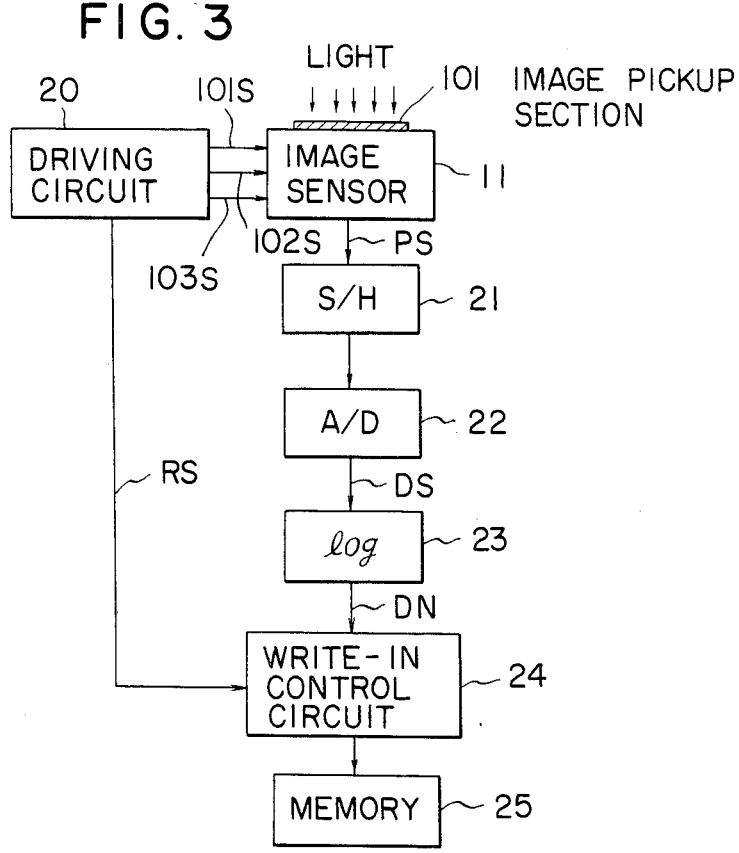
FIG. 3
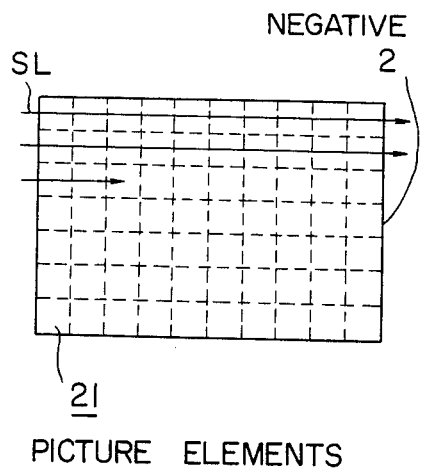
FIG. 4A
FIG. 4B

FIG. 6A

| 150 | 141 | 137 | 121 | 138 | 148 | 151 | 140 | 133 | 135 | 120 | 122 | 108 | 133 | 123 | 130 | 145 | 150 |
|---|---|---|---|---|---|---|---|---|---|---|---|---|---|---|---|---|---|
| 148 | 132 | 71 | 50 | 61 | 70 | 85 | 80 | 70 | 72 | 65 | 81 | 76 | 85 | 80 | 115 | 148 | 153 |
| 151 | 140 | 70 | 43 | 20 | 13 | 15 | 14 | 16 | 15 | 14 | 16 | 15 | 18 | 78 | 103 | 150 | 155 |
| 150 | 135 | 69 | 41 | 18 | 5 | 4 | 5 | 6 | 4 | 5 | 7 | 6 | 17 | 69 | 94 | 142 | 150 |
| 142 | 122 | 60 | 38 | 17 | 6 | 0 | 0 | 0 | 0 | 0 | 0 | 8 | 15 | 53 | 82 | 131 | 141 |
| 139 | 120 | 55 | 33 | 15 | 5 | 0 | 0 | 0 | 0 | 0 | 0 | 7 | 16 | 58 | 88 | 140 | 145 |
| 138 | 120 | 62 | 40 | 19 | 8 | 0 | 0 | 0 | 0 | 0 | 0 | 6 | 14 | 43 | 70 | 110 | 140 |
| 143 | 125 | 65 | 40 | 18 | 7 | 0 | 0 | 0 | 0 | 0 | 0 | 8 | 17 | 47 | 73 | 108 | 148 |
| 147 | 130 | 80 | 48 | 21 | 6 | 7 | 5 | 4 | 6 | 5 | 7 | 7 | 20 | 55 | 81 | 120 | 155 |
| 150 | 138 | 89 | 52 | 30 | 20 | 18 | 13 | 10 | 17 | 15 | 18 | 20 | 25 | 40 | 73 | 115 | 153 |
| 153 | 144 | 93 | 65 | 54 | 51 | 46 | 38 | 32 | 45 | 43 | 48 | 58 | 60 | 65 | 80 | 105 | 148 |
| 155 | 151 | 155 | 140 | 113 | 110 | 119 | 120 | 140 | 150 | 151 | 140 | 151 | 155 | 150 | 150 | 152 | 150 |

FIG. 6B

| 53 | 38 | 28 | 26 | 27 | 29 | 27 | 25 | 25 | 30 | 35 | 33 | 31 | 29 | 36 | 37 | 49 | 71 |
|---|---|---|---|---|---|---|---|---|---|---|---|---|---|---|---|---|---|
| 50 | 31 | 5 | 4 | 5 | 7 | 6 | 4 | 4 | 6 | 7 | 7 | 5 | 4 | 5 | 6 | 40 | 64 |
| 61 | 35 | 6 | 0 | 0 | 0 | 0 | 0 | 0 | 0 | 0 | 0 | 0 | 0 | 0 | 8 | 43 | 67 |
| 50 | 28 | 4 | 0 | 0 | 0 | 0 | 0 | 0 | 0 | 0 | 0 | 0 | 0 | 0 | 6 | 37 | 63 |
| 48 | 28 | 4 | 0 | 0 | 0 | 0 | 0 | 0 | 0 | 0 | 0 | 0 | 0 | 0 | 6 | 37 | 62 |
| 61 | 33 | 5 | 0 | 0 | 0 | 0 | 0 | 0 | 0 | 0 | 0 | 0 | 0 | 0 | 7 | 39 | 68 |
| 73 | 42 | 7 | 0 | 0 | 0 | 0 | 0 | 0 | 0 | 0 | 0 | 0 | 0 | 0 | 5 | 35 | 65 |
| 70 | 45 | 7 | 0 | 0 | 0 | 0 | 0 | 0 | 0 | 0 | 0 | 0 | 0 | 0 | 5 | 35 | 66 |
| 66 | 38 | 5 | 0 | 0 | 0 | 0 | 0 | 0 | 0 | 0 | 0 | 0 | 0 | 0 | 6 | 38 | 70 |
| 68 | 39 | 6 | 0 | 0 | 0 | 0 | 0 | 0 | 0 | 0 | 0 | 0 | 0 | 0 | 8 | 43 | 78 |
| 79 | 45 | 8 | 7 | 7 | 5 | 6 | 3 | 3 | 5 | 4 | 5 | 3 | 4 | 4 | 8 | 45 | 72 |
| 80 | 50 | 41 | 38 | 38 | 35 | 37 | 30 | 33 | 37 | 35 | 40 | 33 | 35 | 38 | 43 | 61 | 77 |

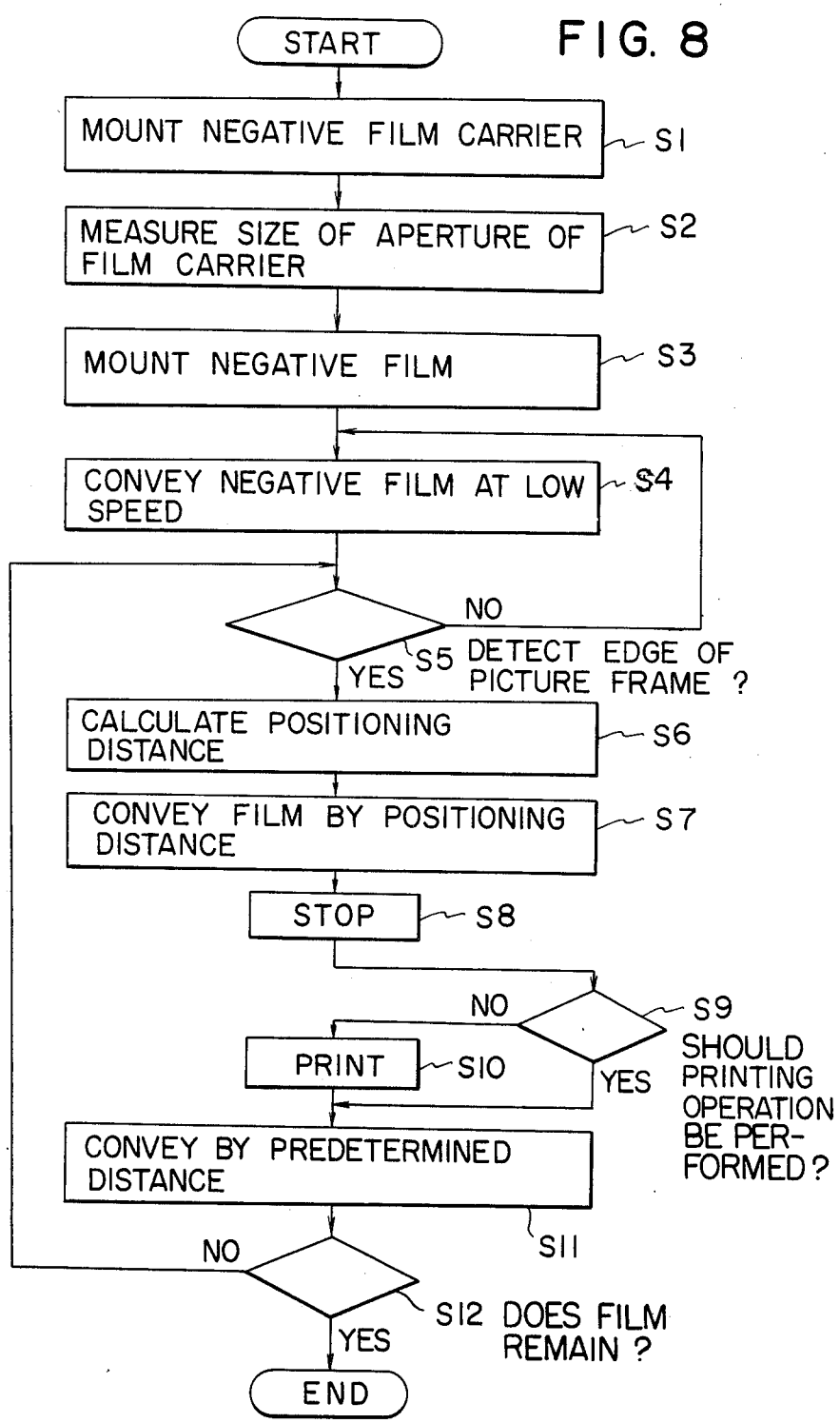

PICTURE FRAME DETECTING AND STOPPING METHOD

This application is a continuation of now abandoned application Ser. No. 709,121, filed Mar. 6, 1985, now abandoned.

BACKGROUND OF THE INVENTION

1. Field of the Invention

This invention relates to a method of automatically detecting a position of a picture frame and stopping the frame in accordance with information regarding a size of an original film such as a negative film, the method being also capable of obtaining an exposure value and correction value of the negative film.

2. Description of the Prior Art

With a photographic printer, in order to suitably print a framed picture of an original film on a photographic printing film, it is necessary to accurately position the picture frame of the original film on an optical frame. This positioning of the picture frame was done in a prior art technique by detecting the position of a notch provided on the side of the original film by utilizing an optical sensor. However, this prior art technique involves a problem in the determination of an accurate positional correspondence between the notch and the picture frame when the notch is provided, and the solution of such a problem is difficult. In another prior art method, the picture frames are positioned by always feeding the frames by a predetermined distance with respect to the original film, but this method also has a problem in that the amount of positional shifts of the picture frames during the continuous frame feeding are increasingly accummulated, thus preventing the picture frames from accurately being fed. Furthermore, in the other prior art technique, there has been proposed a method in which optical sensors, such as photodiodes, are arranged in conformity with the shapes of the frames of the original film and the positions of the frames are determined by the detected conditions of the photodiodes. However, this prior art technique also includes a problem in that a control algorithm for controlling the photodiodes, for example, is complicated.

SUMMARY OF THE INVENTION

In view of the above, it is an object of this invention to eliminate problems encountered to the prior art technique and to provide a method for detecting and stopping picture frames of a negative film on a negative film carrier, in which picture information regarding an original film such as a negative film is accurately detected in detail and picture frames of the original film are positioned by automatically determining the amount of film movement in accordance with size information of the original film.

Another object of this invention is to provide a method for detecting and stopping the picture frames on a negative film carrier in which an exposure value and a correction value therefor are automatically obtained.

According to this invention, these and other objects of this invention can be achieved by providing a method of detecting and stopping picture frames of a film in a photographic printer of the type which essentially comprises a carrier on which a negative film is to be mounted and a two-dimensional sensor for receiving light irradiated from a light source and passing through the carrier, comprising the steps of detecting picture information regarding picture elements which respectively divide and entire area of the negative film as an original film on the carrier based on light which is received by the two-dimensional image sensor, setting a distance that the original film is to be moved in accordance with size determination information of the original film, detecting respective picture frames of the original film by receiving either a transmitted or reflected light from the original film by said two-dimensional image sensor, conveying the original film by the distance set in the previous step, and positioning and stopping the respective picture frames to the negative film carrier.

The method according to this invention can further comprise the steps of calculating an exposure value and a correction value therefor at the negative film carrier with respect to the picture frames in accordance with picture information regarding the respective divided picture elements and determining and correcting the exposure value of the negative film carrier together with automatically conveying the picture frames.

The nature, principle and utility of the invention will become more apparent from the following detailed description when read in conjunction with the accompanying drawings.

BRIEF DESCRIPTION OF THE DRAWINGS

The invention may be more readily understood by reference to the drawings, in which:

FIG. 3 shows a block diagram representing a control system for the two-dimensional image sensor;

FIGS. 4A and 4B are patterns or charts showing an example of the corresponding relationship between the divided picture elements of the original film and the stored data;

FIGS. 6A and 6B are patterns or charts representing an example of picture information regarding this invention, respectively;

FIG. 8 shows a flowchart for carrying out the method of this invention.

DESCRIPTION OF THE PREFERRED EMBODIMENT

Figure 1:
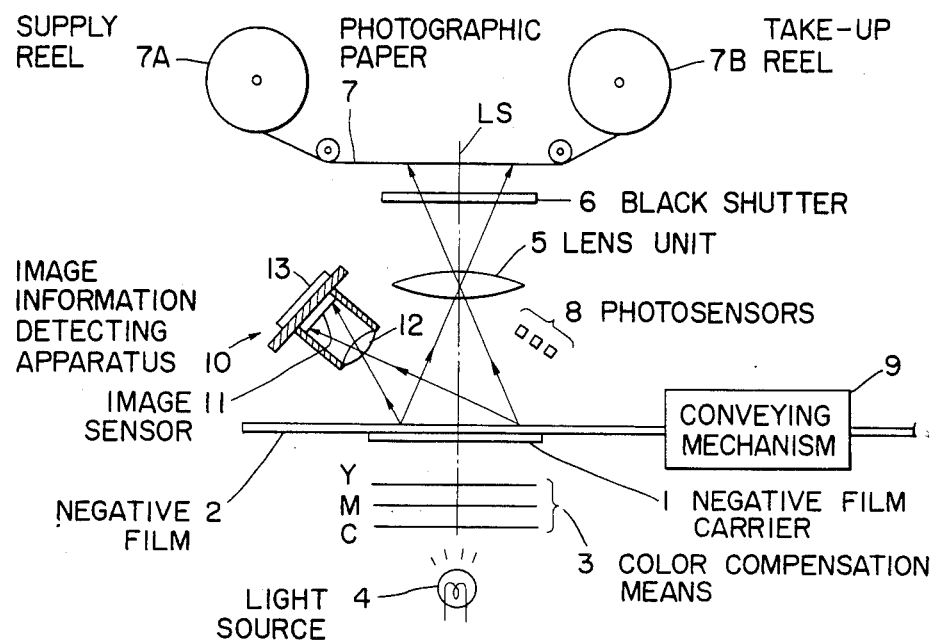
FIG. 1 shows a schematic constructional arrangement of a photographic printer to which the method of this invention is applied.

FIG. 1 is a view showing an example of the photographic image information detecting apparatus 10 for use in accordance this invention when it is applied to a conventional photographic printer without modification. A negative film 2 is conveyed by a conveying mechanism 9 to a position on a negative film carrier 1. The negative film 2 is illuminated with the light from a light source 4 via a color compensation means 3 which comprises three-primary color filters of yellow (Y), magenta (M) and cyan (C). The light transmitted through the negative film 2 is directed to reach a photographic paper 7 via a lens unit 5 and a black shutter 6.

The photographic paper 7 is wound around a supply reel 7A and reeled on a take-up reel 7B in synchronism with the movement and suspension of the negative film 2. Photosensors 8 such as photodiodes are provided near the lens unit 5 of the negative film 2 in order to detect image density information of the three-primary colors. In accordance with the detection signals from such photosensors 8, picture printing is carried out. An image information detecting apparatus 10 comprising a two-dimensional image sensor 11 is positioned near the negative film 2 at a position inclined from an optical axis LS of the light source 4 and the negative film 2. A lens unit 12 is provided in front of the two-dimensional image sensor 11 to substantially focus the center area of the negative film 2. On the back of the image information detecting apparatus 10 is attached a substrate board 13 for mounting a processing circuit comprising integrated circuits and so on.

Figure 2:
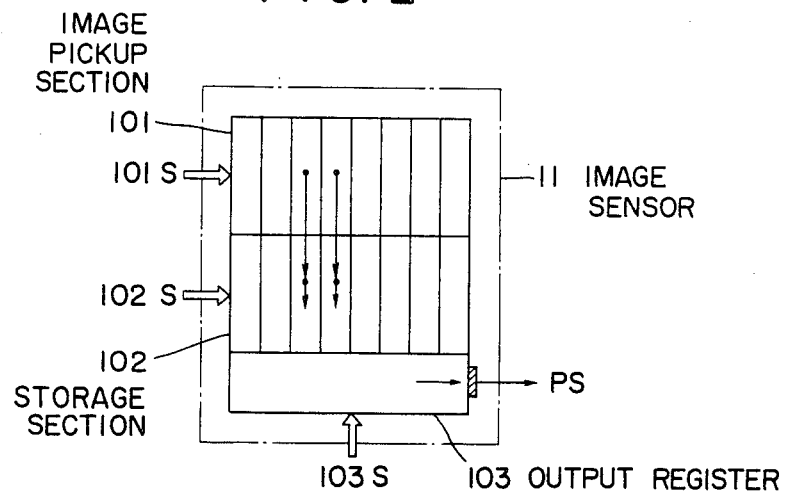
FIG. 2 is a schematic constructional view for showing the function of a two-dimensional image sensor to be utilized for realizing the invention of this application.

The two-dimensional image sensor 11 comprises, as shown in FIG. 2, an image pickup section 101 for optically picking up an image, a storage section 102 for storing charges transmitted from the image pickup section 101, and an output register 103 for outputting the charges stored in the storage section 102. By controlling driving signals 101S through 103S from a driving circuit, the image information in two-dimensions (area) is photoelectrically converted and outputted serially from the output register 103 in the form of an analog image signal PS. The circuit mounted on the substrate board 13 has, for example, a circuit structure shown in FIG. 3. The image sensor 11 is driven by driving signals 101S through 103S supplied from the driving circuit 20. The light illuminating the image pickup section 101 of the image sensor 11 is outputted from the output register 103 as a picture signal PS, sampled and held by a sampling-and-hold circuit 21 at a predetermined sampling cycle. The sample value thereof is converted by an analog-to-digital (A/D) converter 22 into digital signals DS. The digital signals DS from the A/D converter 22 are inputted into a logarithmic converter 23 for logarithmic conversion, and then converted to density signals DN, and then passed through a write-in control circuit 24 and finally written in a memory 25.

A reading speed signal RS from the driving circuit 20 is inputted in to the write-in control circuit 24 in order to read out image information at a predetermined speed when the image sensor 11 is driven. The write-in control circuit 24 sequentially writes in the density signals DS at predetermined positions of a memory in correspondance with the driving speed of the image sensor 11.

When a picture is printed in a conventional manner in the above mentioned structure, the light transmitted through one frame of a negative film 2 which has been conveyed to and standing still at a printing position is detected by a photosensors 8. Then, the filters in the color compensation means 3 are adjusted in response to the picture signals for each of the primary RGB colors and the black shutter 6 is opened to expose a photographic paper 7 with the determined exposure amount.

According to this invention, on the other hand, an image information detecting apparatus 10 comprising a two-dimensional image sensor 11 of area scanning type such as a CCD is mounted at a position near the negative film 2 at an inclined angle in respect of an optical axis to facilitate mounting operation. The whole frame of a negative film 2 is segmented into a large number of arrayed picture elements for detecting image information. In other words, when predetermined driving signals 101S through 103S are fed from the driving circuit 20 to the image sensor 11, the two-dimensional image sensor 11 is adapted to receive the light transmitted through the negative film 2 on the printing section via the lens unit 12. The two-dimensional image sensor 11 can therefore sequentially scan the whole surface of a frame of the negative film 2 along the scanning lines SL by segmenting the whole area into a large number of small arrayed picture elements as shown in FIG. 4A. After the whole area has been scanned, the output register 103 of the image sensor 11 outputs a picture signal PS sequentially; then, the picture signal PS is sampled and held by a sample-and-hold circuit 21 and the sampled value thereof is converted by an A/D converter 22 into digital signals DS. The digital signals DS from the A/D converter 22 are logarithmically converted by a logarithmic converter 23 to density signals DN. The density signals DN are controlled by a write-in control circuit 24 to be stored in a memory in the arrays corresponding to the picture elements 21 shown in FIG. 4B and in terms of the density digital values of the negative film 2.

If the digital values for respective picture elements of the negative film 2 or the density values for respective elements in respect of three primary colors are stored in the memory 25, it is possible to read out the digital values for any particular picture element of the negative film 2 out of the memory 25. If the density values for each of the three primary colors of R, G and B are stored as shown in FIG. 4B, it is possible to read out such values from the memory for processing (which will be described hereinafter) in order to determine the exposure or correction amount for photographic printing in the same manner as in the prior art.

Figure 5A:
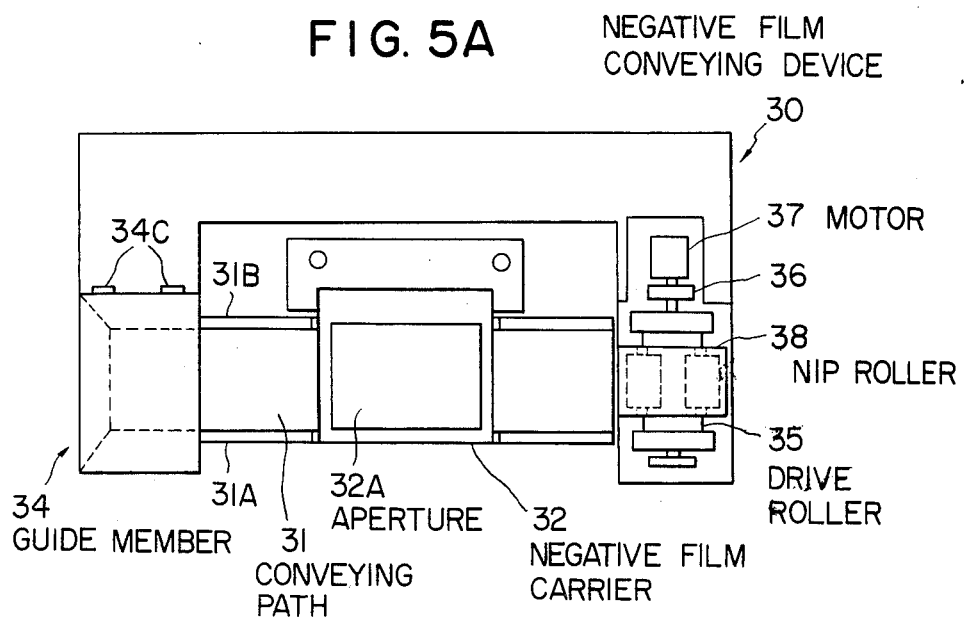
FIGS. 5A and 5B show plan and side views of the printing portion of the photographic printer shown in FIG. 1, respectively.
Figure 5B:
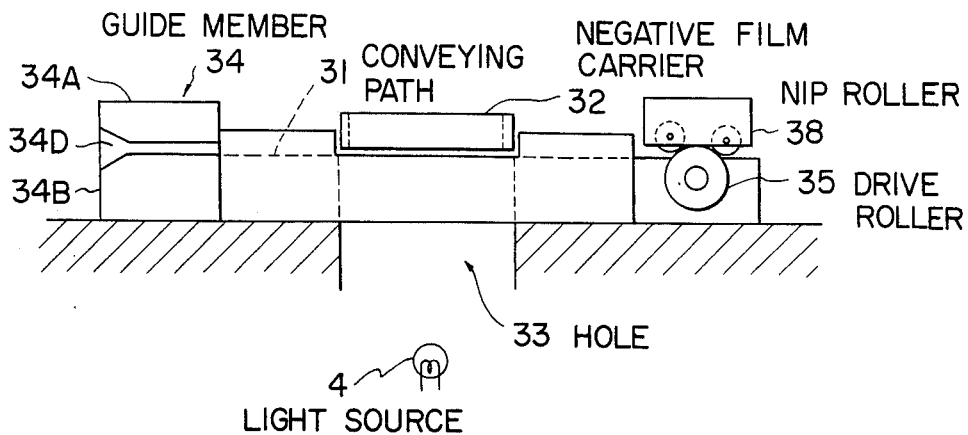

The negative film 2 having an elongated shape is continuously conveyed towards the printing portion by the negative film conveying device 30, into which a negative film carrier 32 provided with an aperture 32A having a rectangular shape corresponding to the size of the negative film 2 to be used is incorporated at the central portion of the negative film conveying path 31 as shown in FIGS. 5A and 5B so as to convey the negative film 2 between the negative film conveying path 31 and the negative film carrier 32. Guide walls 31A and 31B are vertically located on both sides of the negative film conveying path 31 for guiding the conveyance of the negative film, and a hole 33 is formed directly below the negative film carrier 32 for receiving the light from the light source 4. At the negative film entrance portion of the conveying path 31 is located a guide member 34 consisting of an upper plate 34A and a bottom plate 34B for smoothly guiding the negative film passing therebetween, and the upper plate 34A is constructed so as to be operable by hinge means 34C. At the negative film exit portion of the conveying path 31 is located a negative film drive roller 35 around which the printed and conveyed negative film is wound and the negative film drive roller 35 is rotated by an electric motor 37 through a speed reduction mechanism 36. A nip roller 38 consisting of a pair of rollers is located above the negative film drive roller 35 as shown in FIG. 5A for smoothly mounting and winding the negative film 2 around the drive roller 35 and the nip roller 38 is also opened upwardly through hinge means which are not shown.

According to the construction of the negative film conveying device 30 as shown in FIGS. 5A and 5B, the negative film provided for the printing procedure is introduced through the aperture 34D of the guide member 34 and conveyed on the negative film conveying path 31 below the negative film carrier 32 and towards the terminal exit of the conveying path 31, at which point the conveyed negative film is mounted and wound around the negative film drive roller 35 through the operation of the nip roller 38. Usually, the negative film carrier 32 should be selected and used in accordance with the size of the negative film to be used, but it is to be noted that the aperture 32A of the carrier 32 corresponds significantly in size to the frame corresponds to the flame size of the negative film and the blanked portion at the peripheral portion of the picture frame is never beyond the edge of the aperture 32A of the carrier 32. For this reason, the light receiving area of the two-dimensional image sensor 10 is not limited to the picture frame of the negative film 2 but includes a non-light-transmittance portion of the negative film carrier 32 so that a relatively large sized negative film can be treated. The picture information regarding the area to be detected by the two-dimensional image sensor 10, for example, the picture information of the negative film carrier of a 110 size type, is shown as represented by FIG. 6A, and that of the negative film carrier of 135F size type is shown as represented by FIG. 6B. FIGS. 6A and 6B show an example of the detected picture information regarding the blanked picture in which no picture has been photographed on the negative film 2 or an example of the absence of a negative film, respectively, and in both examples, the central portions enclosed by the dotted lines correspond respectively to the size of the aperture 32A of the film carrier 32. Since the size of the aperture 32A corresponds to the size of the negative film carrier 32 to be used, the film density value "0" (or a value near "0") representing the blanked portion is detected from the information regarding the aperture of the carrier 32 read out by the two-dimensional image sensor 10 and the area of the blanked portion can thus be obtained. In this manner, the area of the aperture 32A of the film carrier 32 can be obtained and finally, the size of the negative film 2 can be determined. Moreover, in those procedures, since the light axis of the two-dimensional image sensor 10 is directed towards substantially the central portion of the aperture 32A, the number of the picture elements having "0" density values are counted by either hardware or software techniques, and by comparing the counted values with predetermined values with respect to the respective film sizes the size of the negative film 2 can be determined.

As described above, the size of a negative film 2 is determined by measuring the area of a density "0" which corresponds to the number of picture elements which indicates the size of the aperture 1A of the negative carrier 1. For example, as shown in FIG. 6A, if the number of picture elements of "0" density is "24" (which may be "30 to 34" for a margin allowance), the size is judged to be a 110 size, as shown in FIG. 6B; if the number is "96" (or "82 to 110" for a margin allowance), the size is judged to be a 135 size, and if the number is "126 to 130", the size is judged to be a 126 size. However, the method of size determination is not limited to the above method. The size information determined in the above manner is supplied to the photographic printing system so as to determine the exposure value by the selection of applicable formula or by a calculation using a formula for conducting a photographic printing process in correspondence with the particular size. The information regarding the size of the negative film 2 can be also inputted in accordance with the direct observation of an operator.

As a method for determining a printing exposure value, Japanese Patent Laid-open (KOKAI) Specification Nos. 23936/1977, 28131/1979 and 2691/1981 disclose methods in each of which a picture of the negative film is divided into a plurality of picture elements to obtain picture information regarding the respective picture elements and the exposure value suitable for a required scene can be determined by the information of the divided picture elements. More in detail, an exposure value X1 of a film having a size of, for example, a 135F type is represented by the following equation (1) and an exposure value X2 of a film having a 110 size is also represented by the following equation (2).

$$X1 = a1 \cdot Da + b1 \cdot Dmax + c1 \cdot Dmin + D1 \tag{1}$$

$$X2 = a2 \cdot Da + b2 \cdot Dmax + c2 \cdot Dmin + D2 \tag{2}$$

where Da is an average transmittance density of the picture surface of the film, and Dmax is the maximum transmittance density of the divided picture element surface, and Dmin is the minimum transmittance density of the divided picture element surface. Accordingly, the printing of the negative film 2 can be done in accordance with an exposure value Xs correctly amended in correspondence with the film size by providing the exposure value Xs of each film size with respect to the exposure value X obtained by the equations (1) and (2), for example, and the exposure value Xs is generally represented by the following equation (3)

$$Xs = Ki + Kj \cdot X \tag{3}$$

where Ki and Kj are coefficients which are determined by experiments on the basis of the sizes of the films to be used.

Figures 7A, 7B:
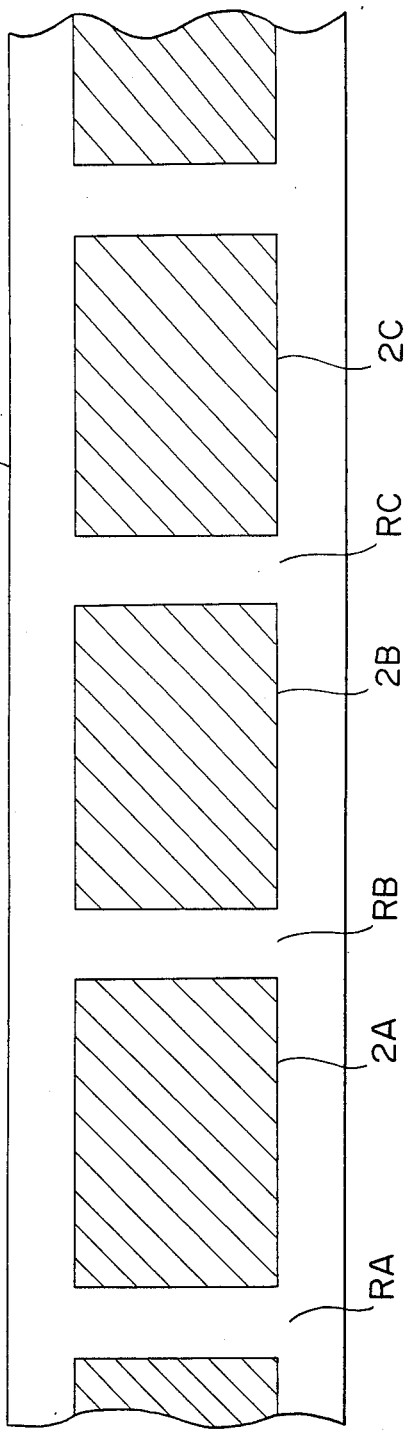
FIGS. 7A and 7B are views showing a relative relationship between a negative film and the picture information thereof.

In a case where the negative film 2 is conveyed to the printing portion to carry out the printing operation, it is necessary to accurately position the photographed picture frames 2A, 2B, 2C . . . as shown in FIG. 7A on the negative film carrier 32, and after one required picture frame has been printed, the negative film 2 is conveyed so that the succeding picture frame is positioned and stopped on the carrier 32. With this picture frame positioning and stopping operation, in the prior art technique, a notch for automatically stopping the picture frame at the predetermined position is preliminarily provided on the negative film 2 by using an auto-notcher. On the contrary, according to this invention, since the picture information regarding the respective picture elements of the two-dimensional image sensor 10 such as shown in FIG. 7B are detected with respect to the negative film 2 of the type shown in FIG. 7A, the picture frames 2A, 2B, 2C . . . can be detected by this picture information and the non-photographed areas RA, RB, RC . . . between the adjacent picture frames can be also detected by the data regarding the density of the picture so as to thereby detect and stop the picture frames together with the picture size information.

FIG. 8 shows a flowchart for carrying out the method according to this invention in which the negative film carrier 32 having a size suitable for the size of a negative film 2 to be printed on the predetermined position of the printing portion (Step S1) and the size of the aperture 32A of the carrier 32 is measured by the method described hereinbefore is use of the image sensor 10 (Step S2). The measurement of the size of the aperture 32A may be done visually. According to this size measurement, the amount of negative film 2 fed and the printing exposure value and the correction value of the exposure value are properly controlled.

A negative film 2 to be printed is then applied (Step S3), and when the leading end of the negative film 2 mounted on the negative film drive roller 35, the motor 37 is driven to convey the negative film 2 (Step S4) and the picture information is detected by the image sensor 10 so as to thereby obtain the data regarding the respective picture elements such as shown in FIG. 7A. As is apparent from the corresponding relationship between FIGS. 7A and 7B, a significant difference in the picture density is generally recognized between the picture frames 2A, 2B, 2C . . . photographed on the negative film 2 and the non-photographed areas RA, RB, RC . . . , so that the edge portions EA, EB, EC . . . of the picture frames 2A, 2B, 2C . . . can be detected respectively by searching an area within a range which has a horizontally sharply variable portion and a vertically constant variable portion. The negative film 2 is conveyed at a low speed continuously until the edge portion of the picture frame is detected (Step S4 and S5), and after the detection of the edge portion EA of the picture frame (i.e. the first picture frame 2A in this case), a distance to the picture frame positioning position on the printing portion is calculated (Step S6) in accordance with the size information obtained by the Step S2. The negative film 2 is then conveyed by the thus calculated distance (Step S7) and thereafter stopped (Step S8). In these steps, the distance from the edge portion of the picture frame to the printing portion for this picture frame can be preliminarily calculated by knowing the size of the picture frame, and consequently, the negative film 2 is stopped accurately in position on the printing portion. Further, it will be noted that since the first picture frame of the negative film 2 may be a blank frame in some cases, the first picture frame may be manually positioned.

After the negative film 2 has been conveyed and stopped, it is determined whether or not the thus stopped picture frame is suitable for being printed (Step S9), and if it is not suitable for the printing, the negative film 2 is conveyed by a predetermined distance (Step S11) and otherwise, if it is determined to be suitable for the printing, the stopped picture frame is printed with the exposure amount and the correction amount therefor as described hereinbefore (Step S10). After the completion of the printing of the picture frame (i.e. image frame 2A), the negative film 2 is conveyed at a high speed by a predetermined distance (for example, half of the distance between the adjacent two image frames) in accordance with the information regarding the size of the aperture 32A obtained at the Step S2 so as to convey and print the next picture frame (i.e. frame 2B in this example) on the printing portion. After the step S10, it is determined whether or not unprinted portions of the negative film 2 yet remain, and if portions of the negative film 2 yet remain, the operation is returned to the Step S5 to again start the printing operation (Step S12). The determination as to whether or not portions of the negative film 2 remain (Step S12) can be done by observing the fact that the negative film 2 does not exist on the negative film carrier 32, i.e. by detecting the fact that all picture information of the aperture 32A becomes "0" as shown in FIGS. 6A and 6B. Moreover, the determination as to whether the picture frame stopped on the printing portion is available for the printing operation or not (Step S9) can be done by detecting the fact that all of the picture information shown in FIG. 4B is greater than a constant value (corresponding to a case of an entremely over-exposed negative film), is less than a constant value (corresponding a case of an extremely under-exposed negative film), or is within a constant range (corresponding to a case of an extremely low contrast negative film).

The picture frames can be automatically subsequently printed by repeating the conveying and stopping steps as described above. When the negative film 2 has been used up at the Step S12, the idle driving of the negative film drive roller 35 is automatically stopped, thus ending the printing operation, and the ending of this film treating procedure may be signalled to the operator by generating an alarm signal or noise.

Although the image information detecting apparatus 10 is arranged at an inclination in respect of the optical axis of the negative film 2 and the light source 4 for facilitating mounting in the above embodiment, the light transmitted through a negative film 2 may be reflected by a beam splitter arranged in front of a lens unit 5 and the reflected light may be guided to the detecting apparatus 10. In such a case, the transmitted light from the beam splitter is illuminated on a photographic paper 7 via the lens unit 5. The lens unit 5 and the detecting apparatus 10 may be made movable mechanically with respect of the optical axis LS so that when a negative film 2 is printed on the photographic paper 7, the lens unit 5 is made aligned to the optical axis LS while the image information of the negative film 2 is detected, and the image information detecting apparatus 10 is aligned with the optical axis LS. Although the image information is detected by the detecting apparatus 10 out of the transmitted light through the negative film 2 in the above embodiment, it may be detected from the light reflected from the negative film 2.

The number of component elements of an image sensor may be selected arbitrarily. Depending upon the size of an original film such as a negative film, the magnification of the lens unit or the necessary number of picture elements of a frame, the number of component elements of the image sensor may be selected arbitrarily.

According to this invention, since picture information regarding an original film and the peripheral area thereof can be detected by an image sensor and picture frames are detected and automatically positioned on the predetermined position in accordance with the information of the size of the original film, the photographic film procedure can be performed accurately and effectively. In addition, the picture frames can be automatically conveyed and the exposure amount and its correction amount can be also calculated, so that the improved automatic high speed printing operation can be realized.

It will be apparent that many modifications and variations may be effected without departing from the scope of the novel concepts of this invention.

What is claimed is:

1. A method for detecting and stopping picture frames of an original film in a photographic printer of the type which essentially comprises a film carrier on which the original film is to be mounted and a two-dimensional image sensor for receiving light irradiated from a light source and passing said film carrier, comprising the steps of microscopically detecting picture information regarding divided picture elements respectively of the whole area of the original film on said film carrier which is located at a printing position light-received by said two-dimensional image sensor, said area being divided into a large plurality of very small picture elements, setting a distance that the original film is to be moved in accordance with a size discrimination information of the original film, detecting respective picture frames of said original film by receiving a transmitted or reflected light from said original film by said two-dimensional image sensor, conveying said original film by the distance set in the previous step, and positioning and stopping the respective picture frames at said printing position of said film carrier.

2. A method according to claim 1, wherein said size discrimination information is detected by said two-dimensional image sensor.

3. A method according to claim 1, wherein said size discrimination information is manually inputted by an operator.

4. A method according to claim 1, wherein said picture information of said original film is detected by said two-dimensional image sensor which is arranged at an inclination with respect to an optical axis.

5. A method according to claim 1, further comprising the steps of calculating an exposure amount and a correction amount therefor at said film carrier with respect to said picture frames in accordance with the picture information regarding said divided respective picture elements and determining and correcting the exposure amount at said film carrier together with automatically conveying the picture frames.

* * * * *